(12) United States Patent
Paden et al.

(10) Patent No.: US 7,624,278 B2
(45) Date of Patent: Nov. 24, 2009

(54) RESETTING ACCESS ACCOUNT PASSWORDS OF A MULTITUDE OF COMPARTMENTALIZED SYSTEMS

(75) Inventors: Jonathan Paden, Austin, TX (US); Bobby Sams, Austin, TX (US); Kurt M. Joseph, Austin, TX (US); Jon Harris, Little Elm, TX (US); Antonio Green, Round Rock, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1152 days.

(21) Appl. No.: 10/937,959

(22) Filed: Sep. 10, 2004

(65) Prior Publication Data

US 2006/0059361 A1   Mar. 16, 2006

(51) Int. Cl.
| | |
|---|---|
| *G06F 21/00* | (2006.01) |
| *G06F 7/04* | (2006.01) |
| *G06F 13/00* | (2006.01) |
| *H04M 3/38* | (2006.01) |
| *H04M 3/53* | (2006.01) |
| *G06F 1/00* | (2006.01) |

(52) U.S. Cl. .................. 713/182; 713/186; 726/2; 726/5; 726/18

(58) Field of Classification Search ............ 713/182, 713/186; 726/2, 5, 18
See application file for complete search history.

(56) References Cited

U.S. PATENT DOCUMENTS

| | | | |
|---|---|---|---|
| 6,016,476 A | 1/2000 | Maes et al. | |
| 6,625,258 B1 | 9/2003 | Ram et al. | |
| 6,973,575 B2 * | 12/2005 | Arnold | 713/182 |
| 2002/0147914 A1 | 10/2002 | Arnold | |
| 2003/0229492 A1 | 12/2003 | Nolan | |
| 2004/0017898 A1 | 1/2004 | Reynolds | |

FOREIGN PATENT DOCUMENTS

WO   WO 2009029297 A1 *   3/2009

OTHER PUBLICATIONS

Judith A. Markowitz, "Voice Biometrics", Sep. 2000, Communications of the ACM, vol. 43 Issue 9, Publisher: ACM, pp. 66-73.*

* cited by examiner

*Primary Examiner*—Emmanuel L Moise
*Assistant Examiner*—Courtney D Fields
(74) *Attorney, Agent, or Firm*—Ed Guntin; Akerman Senterfitt

(57) ABSTRACT

A method for resetting access account passwords using an interactive voice response system (IVR) can include the step of the IVR receiving a user request to reset a password. Account identification data can be acquired. The acquired data can be matched to account information stored in at least one compartmentalized system. The matching can identify at least one access account for which the user request applies. The IVR can also receive account verification data and compare this data with data stored within the compartmentalized system associated with the identified access account. Based upon results of this comparison, the IVR can reset the password stored within the compartmentalized system. The IVR can be configured to reset passwords for several compartmentalized systems.

21 Claims, 2 Drawing Sheets

RESETTING ACCESS ACCOUNT PASSWORDS OF A MULTITUDE OF COMPARTMENTALIZED SYSTEMS

BACKGROUND

1. Field of the Invention

The present invention relates to the field of networking and, more particularly, to resetting account passwords using an Interactive Voice Response System.

2. Description of the Related Art

Internet service providers (ISPs) connect users to the Internet in a variety of manners, such as dial-up, digital subscriber line (DSL), cable, satellite, or the like. Regardless of the connection methodology, a user can be required to provide a user identifier and an associated password before being granted access to the ISP's services. User identification allows the ISP to provide user-specific services, like e-mail, news groups, chatting, instant messaging, or the like. Passwords assure that the present user is authorized to access the identified account.

Users sometimes lose or forget passwords associated with the access accounts. The likelihood that passwords will be forgotten increases when the ISP utilizes security enhancing techniques to prevent unauthorized users from guessing passwords. Security enhancement techniques can require a minimum password length, can require a password to include both letters and numbers, can disallow dictionary entries as passwords, can cause passwords to periodically expire, or the like.

When users lose or forget their passwords, the associated password must be reset. Conventional automated password reset mechanisms, which are primarily Web based, can require Internet access, which a user who has lost or forgotten their account password often lacks.

Another way that a user can reset a password is through a customer service representative. Customer service centers, however, are generally minimally staffed to reduce costs. Minimally staffing a customer service center can result in frustratingly long wait times. Additionally, a customer service center may be only manned during regular business or daytime hours, even though many subscribers use the ISP services outside those hours. Consequently, subscribers can be forced to wait a significant time after a problem with their password has been discovered, before that problem can be resolved. Further, the sheer volume of customer service calls to reset passwords, which can account for approximately a fourth of total call volume, can significantly affect the manning requirements of the customer service center.

Additionally, different ISP services supplied to different regions can be handled in a compartmentalized fashion. For example, a single ISP can have different computer systems or company divisions to handle different types of connection services. Moreover, a single type of service can be subcontracted out by region. For example, DSL services for a southern region can be handled by a different telecommunication subcontractor than DSL services for a northern region. Each system, region, and/or division that handles ISP services can function in an autonomous fashion, maintaining separate user billing databases, user accounts, password files, and the like.

The different compartmentalized ISP sections can be transparent to the users. Users can incorrectly assume that a single ISP maintains services from a single centralized location. Therefore, a user that switches from dial-up services to DSL services can become frustrated, when different customer support systems and different account record-keeping functions are used. Further, ISP's relying upon different, largely redundant systems that provide customer support for different compartments, incur the cost of maintaining these multiple support systems. A secure, user-friendly means of automatically resetting passwords would permit ISP call centers to be operated with fewer live agents while providing increased support. Ideally, the password resetting means would be flexible enough to handle password resets for different compartmentalized systems in a uniform manner.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

The present invention provides a system, a method, and an apparatus for resetting passwords of multiple compartmentalized systems without agent assistance. Each of the compartmentalized systems can represent a subsystem used by an ISP provider to service a particular group of users. Each of the compartmentalized systems can maintain user accounts, account passwords, and related information in a system-specific manner. An interactive voice response system (IVR) having password resetting capabilities can function as an interface for each of these multiple compartmentalized systems. Using the IVR interface, users can have their account passwords reset, regardless of which of the compartmentalized systems the user's passwords are maintained within.

Figure 1:
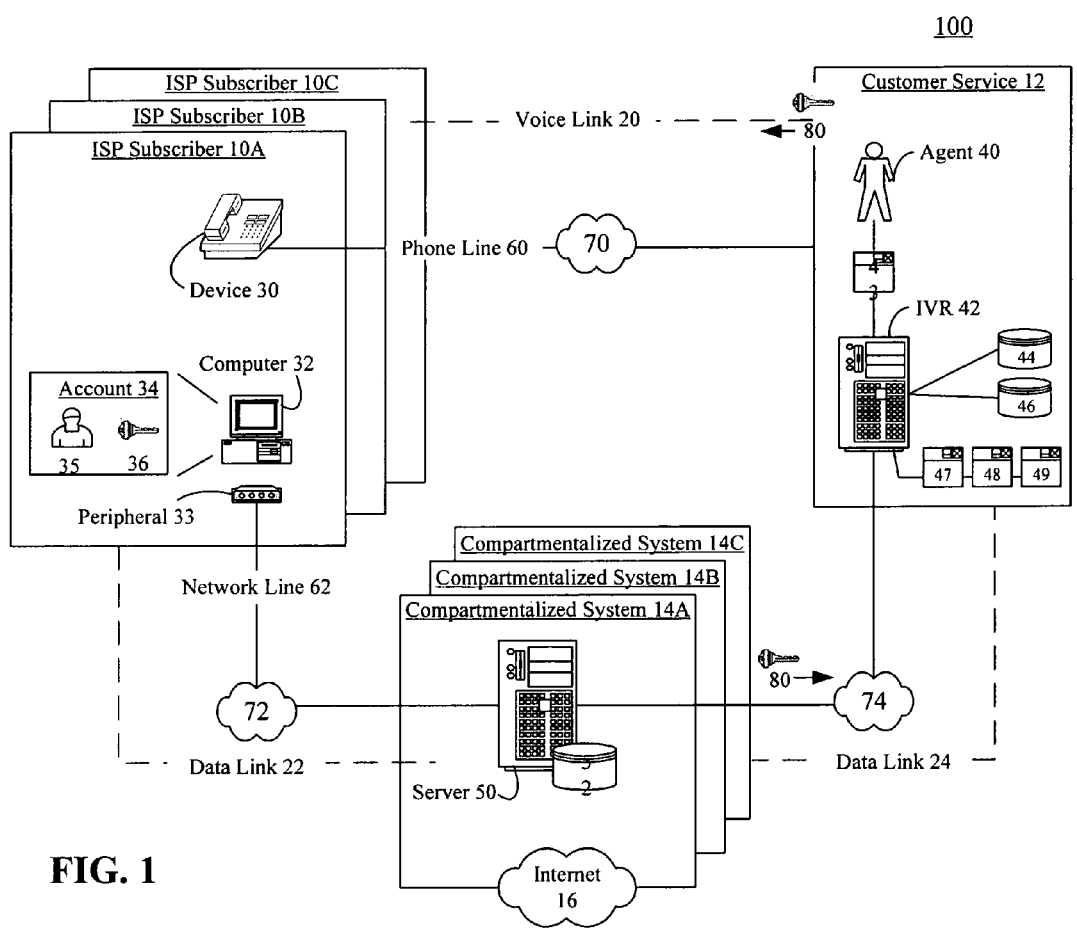
FIG. 1 is a schematic diagram of a system for resetting access account passwords in multiple compartmentalized systems using an interactive voice response system (IVR) in accordance with an embodiment of the inventive arrangements disclosed herein.

FIG. 1 is a schematic diagram of a system for resetting access account passwords in multiple compartmentalized systems using an interactive voice response system (IVR) in accordance with an embodiment of the inventive arrangements disclosed herein. The system 100 can include ISP subscribers 10A, 10B, 10C, a customer service center 12 and compartmentalized systems 14A, 14B, 14C. Each of the compartmentalized systems 14A, 14B, 14C can grant Internet 16 access to one or more of the ISP subscribers 10A, 10B, 10C. Each compartmentalized system 14A, 14B, 14C can separately maintain user access accounts and passwords.

For example, compartmentalized system 14A can manage dial-up access accounts, compartmentalized system 14B can manage DSL accounts, and compartmentalized system 14C can manage cable network accounts. In another example, compartmentalized system 14A can handle DSL services for a southern region, compartmentalized system 14B for a northern region, and compartmentalized system 14C for a central region. In still another example, compartmentalized system 14A can represent one ISP service provider that uses the customer service center 12, compartmentalized system 14B can represent another ISP service provider that uses the customer service center 12, and compartmentalized system 14C can represent still another ISP service provider that uses the customer service center 12.

The customer service center 12 can be granted permission to reset passwords within the compartmentalized systems 14A, 14B, 14C. Each of the ISP subscribers 10A, 10B, 10C can use the customer service center 12 as a means for interfacing with the compartmentalized systems 14A, 14B, 14C so that ISP account passwords can be reset responsive to user requests.

ISP subscribers 10A, 10B, 10C can establish a voice link 20 with the customer service center 12. The voice link 20 can be a standard public switched telephone network (PSTN) connection, which is typically a circuit-switched connection. The voice link 20 is not limited in this regard, however, and a packet-based connection that utilizes a technology like Voice over Internet Protocol (VoIP) can also form the voice link 20.

In one embodiment, the voice link 20 is formed when the device 30 connects to the customer service center 12 through a phone line 60. The device 30 can be any of a variety of customer premise equipment (CPE) devices, such as a touch-tone telephone. The phone line 60 can be a land-based line, such as a twisted pair telephone line. The device 30 and the phone line 60 are not to be limited in this regard, however, and any suitable equipment and connectivity pathway can be utilized herein. For example, the device 30 can include a video teleconferencing station, mobile telephone, a two-way radio, or the like. The phone line 60 can include any type of physical communication line as well as equipment, such as transducers, transmitters, receivers, repeaters, or the like, for establishing a wireless communication pathway.

The ISP subscribers 10A, 10B, 10C can connect a computer 32 to any of the compartmentalized systems 14A, 14B, 14C and responsively receive Internet access 16 via a data link 22. The computer 32 can be any communication device capable of Internet access, including a personal computer, a data tablet, a smart phone, a personal data assistant (PDA), an embedded device, or the like. The data link 22 can be any connection that permits packetized information to be conveyed between the computer 32 and the server 50 or between the computer 32 and other compartmentalized system component.

In one embodiment, the data link 32 is formed when a peripheral 33 attached to the computer 32 connects to the ISP system 14 through a network line 62. The peripheral 33 can be any variety of modem including a cable modem, DSL modem, satellite model, phone-line modem, and the like. The peripheral 33 can also be a router, hub, bridge, or other network connectively device.

The network line 62 can be physically identical to the phone line 60, which is often the situation when the compartmentalized system 14A, 14B, and/or 14C provides dial-up service and/or DSL service. The network line 62 can also be physically separate from the phone line 60, such as when the network line 62 is a coaxial cable line for cable network connectivity or a dedicated telephony line for integrated services digital network (ISDN) service. The network line 62 can also be a wireless "line" such as a satellite link, a Wireless Fidelity (WIFI) connection link, and/or mobile telephony link.

Users of the computer 32 can access the Internet 16 using one or more authorized access accounts 34. Each of the access accounts 34 can have a user identifier 35 and an associated password 36. In one embodiment, one of the accounts 34 can be considered the primary account. Other ones of the accounts can be considered sub-accounts. The primary account can have supervisory authority over the sub-accounts.

The customer service center 12 can include one or more live agents 40 and an IVR 42. The IVR 42 can direct the ISP subscribers 10A, 10B, 10C to the agent 40 whenever an attempt to automatically service the ISP subscriber fails. The WR 42 can be configured as an interface 43 through which ISP subscribers 10A, 10B, 10C are permitted to reset one or more of the passwords 36. The IVR 42 can be communicatively linked to system data store 44 and/or 46.

System data store 44 can include subscriber specific data. Consequently, system data store 44 can be used to log ISP subscriber requests, to store ISP subscribers contact information, can include subscriber hardware/software details, or the like. For example, the system data store 44 can store historical IVR 42 request data. Subscriber specific data can include computer 32 and peripheral 33 specifications. When password resets require modifications to the computer 32 and/or peripheral 33, information in the system data store 44 can be utilized. In one embodiment, the utilized information can be used to provide configuration specific help and/or guidance to callers to modify their own devices. In another embodiment, the IVR 42 can automatically modify the subscribers devices based upon device specific data stored in system data store 44.

System data store 46 can include data specific to the different compartmentalized systems 14A, 14B, 14C. The system data store 46 can include centrally maintained access account information for accounts of the compartmentalized systems 14A, 14B, 14C. Accordingly, the data in the data store 44 can be used to expedite password reset calls and to locate the proper compartmentalized systems 14A, 14B, 14C associated with a particular caller.

Further, the system data store 46 can include system-specific account identification, account verification, and password reset information. For example, the system data store 46 can include different application program interfaces (API's) used by the IVR 42, where each API is associated with a particular compartmentalized system 14A, 14B, and/or 14C. In another example, dynamic link libraries (DLLs), application binary interfaces (ABIs), and other interfaces can be associated with the various compartmentalized systems 14A, 14B, 14C.

The IVR 42 can include account identification engine 47, authorization engine 48, password reset engine 49, as well as other software routines. The account identification engine 47 can be configured to identify one or more access accounts 34 associated with individual subscribers 10A, 10B, 10C. The authorization engine 48 can authorize that a caller is permitted to reset a password 36 corresponding to an identified access account 34. The password reset engine 49 can access the compartmentalized system 14A, 14B, 14C and reset a password within the system corresponding to their identified access account 34.

The customer service center 12 can be connected to the compartmentalized systems 14A, 14B, 14C via data link 24. Data link 24, like data link 22, can be any connection that permits packetized information to be conveyed. The conveyance of the data can occur between IVR 42 and server 50 via network 74.

Each of the compartmentalized systems 14A, 14B, 14C can include hardware and/or software necessary to connect ISP subscribers 10A, 10B, 10C to the Internet 16. Each of the compartmentalized systems 14A, 14B, 14C can include an access account server 50 that authorizes Internet 16 access based upon an access account number and a corresponding password. The access account server 50 can store account specific data in data store 52. The account specific data can include identification information, usage information, payment information, or the like pertaining to access accounts 34. The access account server 50 can also permit authorized administrators and/or the IVR 42 to reset account passwords. The resetting of a password can involve setting a password to a default value as well as randomly generating a new password.

By way of example, the ISP subscriber 10A can realize that password 36 for accessing account 34 having a user identifier 35 has been forgotten. The ISP subscriber 10A can place a telephony call to the IVR 42 using device 30. The IVR 42 can attempt to automatically identify the ISP subscriber 10A from caller identification information present in the call. The IVR 42 can also prompt the ISP subscriber 10A for caller identification data. The IVR 42 can compare the ISP Subscriber 10A specific information to information about access accounts of compartmentalized systems 14A, 14B, 14C. The comparing step can identify at least one access account pertaining to the ISP Subscriber 10A, such as an account of compartmentalized system 14B.

Once the IVR 42 has identified a valid access account for the compartmentalized system 14B, the IVR 42 can prompt ISP subscriber 10A for verification information to verify that the caller is authorized to reset the password. Received verification information can be compared against data within the data store 52 of the compartmentalized system 14B. If the IVR 42 is unable to automatically identify and/or verify an access account, the call can be re-routed to agent 40.

After verification, the IVR 42 can convey a password reset command across network 74 to the access account server 50. The access account server 50 can responsively generate a new password 80 for the identified access account within compartmentalized system 14B. The new password 80 replaces the forgotten password. The password 80 can be conveyed over the data link 24 to the IVR 42. The IVR 42 can then audibly present the new password 80 to the ISP subscriber 10A over voice link 20.

Additionally, a notification that the new password 80 has been generated can be e-mailed to an accessible e-mail account. The password change notification can include a message that the recipient should change the newly generated password to a user specified one. The message can specify a time period in which the password must be changed. Further, the message can provide a link to a Web site that enables the user to reset the password. The message can also provide customer support contact information, so that the recipient can inform an agent of the Internet Service Provider whenever an unauthorized user has attempted to reset a password, thereby enabling the ISP to identity intrusion attempts.

It should be noted that networks 70, 72, and 74, and 16 can be implemented as any of a variety of fashions so long as content is conveyed using encoded electromagnetic signals. Further, any of a variety of communication devices, such as customer premise equipment (CPE), computers, modems, routers, switches, or the like, can be included within networks 70, 72, 74, and 16.

Each of the networks 70, 72, and 74 can convey content in a packet-based or circuit-based manner. Additionally, each of the networks 70, 72, and 74 can convey content via landlines or wireless data communication methods. For example, each of the networks 70, 72, and 74 can separately include an Intranet, a local area network, a wide area network, or a combination thereof. In another example, each of the networks 70, 72, and 74 can include a telephony network, like a mobile wireless network or a public switched telephone network (PSTN).

The data stores 44, 46, and 52 can store information in any recording medium, such as a magnetic disk, an optical disk, a semiconductor memory, or the like. Further, each of the data stores 44, 46, and 52 can utilize any information retention technique including a file-based storage technique or a database storage technique. Moreover, each of the data stores 44, 46, and 52 can be a storage area fixed to a geographical location or a storage area distributed across a network space.

It should be appreciated that the arrangements shown in FIG. 1 are for illustrative purposes only and that the invention is not limited in this regard. The functionality attributable to the various components can be combined or separated in different manners than those illustrated herein. For instance, the server 50 can be implemented as a plurality of communicatively linked computing devices.

Figure 2:
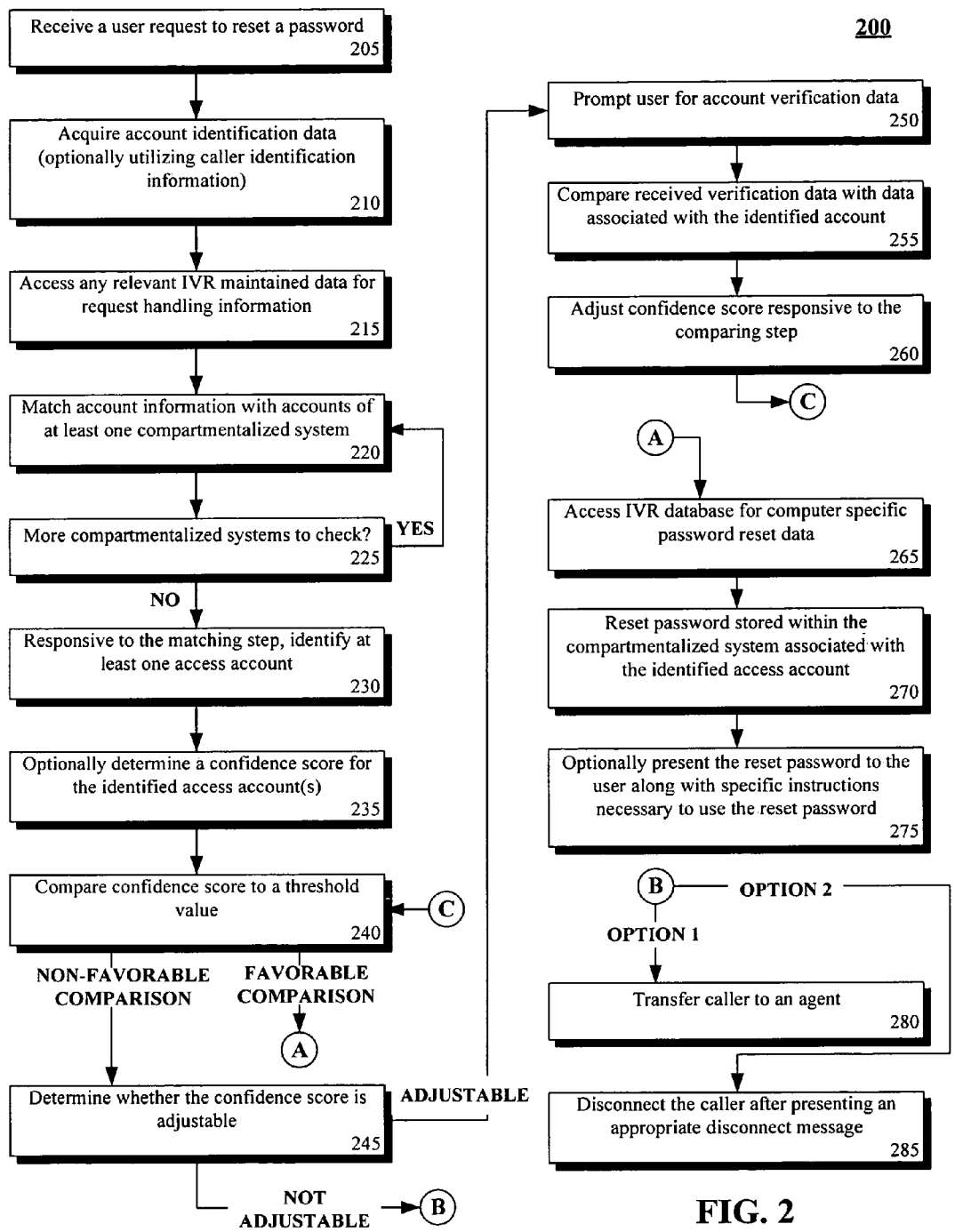
FIG. 2 is a flow chart of a method for resetting account passwords in an automated system in accordance with an embodiment of the inventive arrangements disclosed herein.

FIG. 2 is a flow chart of a method 200 for resetting account passwords in an automated system in accordance with an embodiment of the inventive arrangements disclosed herein. The method 200 can be performed in the context of any of a variety of systems having an IVR with password reset capabilities. For example, the method 200 can be performed in the context of system 100 of FIG. 1.

The method 200 can begin in step 205, where the IVR can receive a user request to reset a password. The user request can be submitted to the IVR by a caller over a voice channel. In step 210, account identification data can be acquired. In one embodiment, the IVR can specifically prompt the caller to enter this data. In another embodiment, at least a portion of the account identification data can be automatically acquired from caller identification information. Caller provided responses can include Dual Tone Multi Frequency (DTMF) responses as well as voice responses. Voice responses can be converted from speech to recognizable text by the IVR. Caller provided information from which account verification occurs can include an account identifier, a user email address, a user name, a user telephone number, a user zip code, and the like.

In step 215, an IVR maintained data store can be accessed. This data store can include request handling information as well as caller specific information. For example, the IVR can store caller provided information for future use so that callers do not need to repeatedly provide password resetting data ever time the IVR is used. Instead, subsequent IVR calls can utilize previously stored data. The IVR provided data can also include data from a plurality of different compartmentalized systems, thereby helping the IVR determine which system or systems a caller's access account data is stored within.

In step 220, account information can be matched with the account information of at least one of the compartmentalized systems. In step 225, if more compartmentalized systems need to be searched for matching accounts, the method can loop back to step 220. Different criteria can be established for whether or not additional compartmentalized systems need to be searched.

In one embodiment, a search can continue until one account found. In another, each compartmentalized system can be searched until all accounts matching the account information are identified. In still another embodiment, each potentially matching account can be associated with a confidence score. In such an embodiment, all accounts having a confidence score above a designated threshold can be identified. It should be noted that account data for the compartmentalized system can be contained within the compartmentalized system and/or be centrally maintained by the IVR.

In step 230, responsive to the matching step, at least one access account can be identified. In step 235, a confidence score can be optionally determined for the identified account(s). The confidence score can be based upon any of a variety of factors.

For example, if an account is associated with a DSL service, the confidence score can be increased when the call to the IVR originates from a phone number associated with the DSL service. In another example, the IVR can perform a reverse directory lookup based upon the caller identification information and increase the, confidence score when user provided identification input matches the information retrieved from the reverse directory lookup. In still another example, the confidence score can be increased when the phone number from which the IVR is contacted matches a phone number through which the last successful dial-up service connection was established. Appreciably, the invention is not to be construed as being limited in this regard.

In step 240, the confidence score can be compared to a threshold value. The method can proceed to step 245 when the comparison is not favorable. In step 245, a determination can be made as to whether the confidence score is adjustable. That is, one embodiment of the invention may permit additional account verification to be input in order to increase the confidence score. Another embodiment of the invention may only permit additional account verification to be input when the confidence score exceeds a minimum or lower threshold. The method can proceed to step 250 when the confidence score is adjustable.

In step 250, the IVR can prompt a caller for account verification data. The verification data need not be separate from the identification data. When the same data is used as both verification data and identification data, step 250 can be skipped. In another embodiment, the verification data can be used as a safeguard to ensure that the caller is authorized to reset a password associated with the identified account. Verification data can include, but is not limited to, a password, a digital signature from a calling device, a reply to a prompted question, an e-mail address, automated number identification data, a telephone number, a zip code, an account identifier, ISP connectivity information, or the like.

In step 255, received data can be compared with data associated with the identified account. In step 260, the confidence score can be adjusted responsive to the comparing step. After the adjusting step, the method can loop back to step 240.

When the confidence score is not adjustable, the method can proceed from step 245 to step 280 and/or step 285, depending upon IVR settings. These settings determine the behavior of the IVR system when the IVR cannot automatically identify and/or verify one or more access accounts with sufficient confidence to automatically proceed. In step 280, the IVR can transfer to the call to a live agent for handling. In step 285, the IVR can present an appropriate disconnect message, and then disconnect the caller.

When step 240 results in a favorable comparison the method can proceed from step 240 to step 265. In step 265, IVR databases can be accessed for system-specific password reset information. For example, each compartmentalized system can have different hardware/software requirements for resetting a password. Further, different public procedures, different application program interfaces (API's), dynamic link libraries (DLLS), and the like can be used by the IVR to reset system passwords maintained by the various compartmentalized systems.

In step 270, the password stored within the compartmentalized system associated with the identified access account can be reset. Resetting a password can set the password to a default state or can randomly generate a new password. In step 275, the newly reset password can be optionally presented to the caller. Additionally, the caller can be presented with caller-specific instructions necessary to utilize the reset password. For example, a DSL subscriber may have to reset a DSL modem when resetting their account password. The caller-specific instructions can be retrieved from an IVR maintained and/or accessible data store.

The steps detailed within method 200 represent one illustrative embodiment of the inventive arrangements disclosed herein. The scope of the invention is to be construed as including adaptive deviations of the method 200 that are essentially the same as steps detailed herein.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for resetting access account passwords using an interactive voice response system (IVR) comprising the steps of:

the IVR receiving a user request to reset a password;

acquiring account identification data;

matching account information stored in at least one compartmentalized system with the acquired account identification data to identify at least one access account for which the user request applies, wherein the IVR is configured to reset passwords for a plurality of compartmentalized systems including the at least one compartmentalized system;

the IVR receiving account verification data;

comparing the received verification data with data stored within the compartmentalized system associated with the identified access account; and based upon results of the comparing step, the IVR resetting the password stored within the compartmentalized system associated with the identified access account.

2. The method of claim 1, wherein the IVR maintains data about hardware and software configurations of the compartmentalized systems, wherein the maintained data is used in the resetting step to perform system-specific actions.

3. The method of claim 1, the acquiring step further comprising the step of:

the IVR automatically acquiring the account identification data based upon caller identification information.

4. The method of claim 3, wherein the access account is a Digital Subscriber Line (DSL) account associated with a phone number, the caller identification information including the phone number, wherein the received verification data also includes said phone number.

5. The method of claim 4, wherein the verification data consists of said phone number.

6. The method of claim 1, wherein the verification data consists of at least one of a password, a digital signature from a calling device, a reply to a prompted question, ISP connectivity information, and automated number identification data.

7. The method of claim 3, wherein the IVR maintains a data store for logging IVR interaction information, wherein said automatically acquiring step further comprises:

accessing the IVR interaction information based upon caller identification information to generate at least a portion of the account identification data.

8. The method of claim 1, wherein the acquired identification data comprises an e-mail address.

9. The method of claim 1, wherein the user request is conveyed to the IVR by a caller, the method further comprising the steps of:

the IVR determining a confidence score that the caller is authorized to reset the password; and comparing the confidence score against a threshold value to determine whether the resetting step is permitted.

10. The method of claim 9, further comprising the steps of:

adjusting the confidence score based upon results of the step of comparing the received verification data with the data associated with the identified access account.

11. The method of claim 9, further comprising the steps of:

prompting for additional account verification data, comparing results from the prompting step with stored data, and adjusting the confidence score repetitively until the confidence score favorably compares to the threshold value.

12. The method of claim 9, further comprising the step of:

when the comparing step does not favorably compare the confidence score to the threshold value, performing at least one action selected from the group consisting of the IVR transferring a caller making the user request to an agent and the IVR disconnecting the caller.

13. The method of claim 9, wherein the determining of the confidence score occurs before the verification step and is based upon account identification data automatically acquired based upon caller identification information.

14. An interactive voice response system (IVR) for resetting access account passwords comprising:

a user interface configured to interact with callers via a voice channel;

an account identification engine configured to identify at least one access account associated with individual callers, wherein each access account is an internet service provider account that provides the caller with Internet access over a data channel;

an authorization engine that authorizes that a caller is permitted to reset a password corresponding to an identified access account; and a password reset engine configured to access an Internet service provider (ISP) system and reset a password within the ISP system corresponding to the identified access account.

15. The IVR system of claim 14, wherein the user interface presents reset passwords to callers over the voice channel.

16. The IVR system of claim 14, wherein the ISP system provides digital subscriber line (DSL) service, the authorization engine requiring callers to contact the IVR from a phone number associated with the DSL service.

17. The IVR system of claim 14, wherein the IVR resets account passwords for a plurality of compartmentalized systems which include said the ISP system, said IVR system further comprising:

a system data store configured to maintain data for system specific operations.

18. The IVR system of claim 17, wherein different ones of the plurality of compartmentalized systems have different system-specific criteria for at least one of identifying access accounts associated with callers and authorizing that callers are permitted to reset passwords of identified accounts, said criteria being included in the system data store, wherein at least one of the account identification engine and the authorization engine utilize the stored criteria.

19. The IVR system of claim 17, wherein the password reset engine utilizes system-specific data maintained in the system data store when resetting passwords.

20. The IVR system of claim 17, further comprising:

a system data store configured to maintain data for system specific operations.

21. A machine-readable storage having stored thereon, a computer program having a plurality of code sections, said code sections executable by a machine for causing the machine to perform the steps of:

receiving a user request to reset a password via an interactive voice response system (IVR) voice channel;

acquiring account identification data;

matching account information stored in at least one compartmentalized system with the acquired account identification data to identify at least one access account for which the user request applies, wherein the IVR is configured to reset passwords for a plurality of compartmentalized systems including the at least one compartmentalized system;

receiving account verification data;

comparing the received verification data with data stored within the compartmentalized system associated with the identified access account; and based upon results of the comparing step, resetting the password stored within the compartmentalized system associated with the identified access account.

* * * * *